United States Patent Office 3,244,694
Patented Apr. 5, 1966

3,244,694
SUBSTITUTED DISAZO SALICYLIC ACID
DYESTUFFS
Ernest M. May, Summit, and Andrew Fono, Montclair,
N.J., assignors to Otto B. May, Inc., Newark, N.J., a
corporation of New Jersey
No Drawing. Filed Jan. 11, 1963, Ser. No. 250,758
11 Claims. (Cl. 260—187)

This is a continuation-in-part of an application, Serial No. 189,265, filed on April 23, 1962, and now abandoned.

This invention relates to new dyes; and, more particularly, it is concerned with compounds which are especially suitable for dyeing shaped articles of polypropylene and other thermoplastic resins, such as polyesters, polyacrylics, polyamides and other polyolefins.

Many known classes of dyes have been applied to polypropylene and other polyolefins in an attempt to dye these materials in a commercially satisfactory way, that is to say, to yield a dye product which is fast to washing and dry cleaning. Those classes of dyes which are water-soluble are for this very reason unsuitable for dyeing polypropylene. The water solubility of these dyes means inherently that they are insoluble in polypropylene, and even if a surface dyeing is achieved they are readily removed by washing. Furthermore, the dyes which are "soluble" in polypropylene (a fundamentally hydrocarbon polymer) are also soluble in dry cleaning solvents and those dyes which have affinity for polypropylene are generally removed by dry cleaning solvents.

An object of the present invention is to obtain dye compositions which are suitable for dyeing polypropylene and other polyolefins.

Another object of the invention is to obtain dyes which can be used for dyeing other thermoplastic resins, such as polyesters, polyacrylics and polyamides.

It is common practice in the textile industry to form composite fabrics containing two or more types of fibers. For example, the composite fabric may be woven of threads containing, in a predetermined pattern, threads of polypropylene, nylon, and/or other fibers, such as polyacrylics, natural fibers, etc. With respect to these composite fabrics, there is an immediate problem of finding a dye which will give a "union" dyeing. This is a problem and a term which is well known in the art.

Accordingly, another object of this invention is to produce dyes which will dye simultaneously and satisfactorily mixed fabrics composed of more than one synthetic and/or wool and silk fibers.

A further object of the present invention is to provide dyes which are fast to washing and severe dry cleaning when applied to shaped articles, particularly fibers containing finely dispersed metallic compounds.

One of the very difficult problems that has confronted the industry is stabilizing polypropylene and other polyolefin fibers against ageing, that is, degradation caused by exposure to air, light, and/or heat. Many types of known stabilizers have been incorporated into the fibers to impart some degree of stability thereto. However, these stabilizers generally are removed by washing and/or dry cleaning with various solvents, and the fibers lose most or all of their resistance to ageing.

Accordingly, still another object of this invention is to stabilize shaped articles formed from polypropylene and other polyolefins and preferably simultaneously stabilize and pigment such materials.

Another object is to improve stability and the resistance of these polymers to ageing, particularly after they have been washed, dry cleaned or exposed to other solvents.

Other objects and advantages of the present invention will appear from the following description.

The dyes, which according to the present invention have been found to be particularly suitable for dyeing polypropylene and other polyolefins, are certain substituted disazo salicylic acid compounds described by the following structural formula:

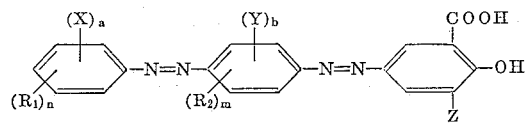

wherein each X is a substituent group attached to the benzene nucleus independently selected from the group consisting of cycloalkyl having up to 6 carbon atoms, nitro, halogen, carbacyl having up to 6 carbon atoms, benzoyl, N-alkylsulfonamido said alkyl containing 1–5 carbon atoms, N,N-dialkylsulfonamido each of said alkyls containing 1–5 carbon atoms, alkoxy containing 1–4 carbon atoms, trifluoromethyl, cyano, benzoylamino, carboalkoxy containing 1–4 carbon atoms, dialkylamino each of said alkyls containing 1–5 carbon atoms, hydroxy, beta-cyanoethyloxy, beta - hydroxyethyloxy, methylsulfonyl, thio-cyano, di-(beta-hydroxyethyl)-amino, beta-hydroxyethylamino and di-(beta-cyanoethyl)-amino; each Y is a substituent group attached to the benzene nucleus independently selected from the group consisting of cycloalkyl having up to 6 carbon atoms, alkoxy containing 1–4 carbon atoms, beta-hydroxyethyloxy, beta-cyanoethyloxy, halogen, and trifluoromethyl; $R_1$ and $R_2$ are alkyl groups having 1 to 20 carbon atoms; Z is selected from the group consisting of hydrogen and methyl; $a$ is an integer from 0 to 4 inclusive; $b$ is an integer from 0 to 4 inclusive; $n$ is an integer from 0 to 4 inclusive; $m$ is an integer from 0 to 4 inclusive; $a+b$ must be at least 1; and $a+b+n+m$ is a maximum of 9.

The foregoing groups may be substituted with simple substituents recognized in the dyeing art such as methyl, nitro, halogen, methoxy and other lower alkoxy groups (containing 1 to 5 carbon atoms), trifluoromethyl, carbonamido, etc.

Preferred substituted disazo salicylic acid compounds are found among those in which the group or groups X or Y include at least one trifluoromethyl group, or at least one halogen (fluorine, chlorine, or bromine), or at least one lower alkoxy group (1 to 4 carbon atoms); or compounds in which the group or groups X include at least one nitro group.

The desirable properties of the compounds described above are realized by reacting them with a metallic compound of aluminum or zinc. The reaction product is generally formed in the shaped articles, such as fibers of polypropylene and other polyolefins, by incorporating initially a metal compound of aluminum or zinc into the polyolefin. This procedure will be described more completely hereafter.

The precise nature and structure of the aforementioned reaction product is not clearly understood. However, it is thought that a chelate ring or linkage may be formed between the metallic cation and the adjacent carboxylic and hydroxyl groups on the salicylic acid ring, and this may be responsible for the desirable properties of the formed reaction product. Furthermore, there is no precise stoichiometric ratio between the dye and the metallic compound. This is believed to be due to any one or more of a number of factors. In the first place, the metallic compound may not penetrate into all of the interstices of the dye or vice versa; and, therefore, the reaction may not be complete. In the second place, aluminum and zinc are known to exist in the form of polymers or oligimers; and, therefore, a single dye molecule may account for more than one atom of the metal. The amount of dye used may be sufficient to account for all of the metal present; however, this is not an absolute requirement. For instance, in dyeing shaped articles, such as fibers, it may not be necessary to provide enough dye to react with all of the metal which is finely divided and uniformly distributed throughout the mass. Furthermore, the ratio of fiber to metal is not a critical feature of the invention and a suitable ratio may be readily determined from a given set of circumstances and the desired objectives.

A particular striking feature of this invention is the stabilizing effect of the substituted disazo salicylic acid dye on the polypropylene or other polyolefin shaped article, such as a fiber. As stated heretofore, stabilizing such materials has been a very difficult problem, particularly since laundering, dry cleaning or exposure to other solvents tend to remove known stabilizers. It has been surprisingly found in accordance with the present invention that the substituted disazo salicylic acid compounds described above impart stability to the polypropylene or other polyolefin and resist removal by laundering, dry cleaning, etc.

The aforementioned disazo dyes can be prepared by any known method. However, they are generally formed by coupling an aminoazo benzene through diazotization with salicylic acid. The aminoazo benzenes can be provided by rearrangement of a diazoamino compound; by coupling a diazonium compound with an aniline derivative; or by coupling the diazonium compound with a N methane sulfonic acid salt of an aniline derivative and subsequently hydrolyzing the resulting product with aqueous alkali. In some instances, it may be necessary to use a solvent other than pure water to provide better solubility of the diazotized aminoazo compound and provide greater coupling speed. Dimethylformamide is a preferred neutral solvent for the diazotization and coupling of relatively insoluble aminoazo compounds with the salicylic acid.

In one embodiment, a shaped article, for example, a synthetic fiber, has a metal incorporated therein before a substituted salicylic disazo dye is applied. The synthetic fibers or other shaped article applicable to this invention include polyolefins, polyesters, for example, condensation products of polybasic acids with polyhydric alcohols and Dacron; polyamides, such as nylon; polymers of acrylic acid compounds, such as, acrylonitrile; and polymers of vinyl compounds, such as, vinyl alcohol, vinyl chloride and styrene. A polyolefin, which is the preferred polymer for a synthetic fiber, includes the following polymers among others: polyethylene, polypropylene, polybutene, poly-3-methyl-butene-1, polypentene, poly-4-methyl-pentene-1, and polyheptene. The polyolefin, e.g., polypropylene, can be prepared by any known method. A suitable, but not the only method, is disclosed in Belgian Patent 533,362, which is incorporated herein by reference.

Synthetic shaped articles are formed from the aforementioned thermoplastic polymers in accordance with known prior art procedures. A fiber, which is preferred, is defined herein as any fibrous unit, e.g., filament yarns, rovings, mats, staple yarns, sheets, rods, plates, woven fabrics and chopped fibers. The following exemplify specific commercial fibers which can be employed herein: Spun Dacron T–54; Nylon Filament Thread; Cresland T58; Acrilan 1656; and Polypropylene 805 Fiber.

Although synthetic fibers are usually employed, the metallic reaction product embodiment is also applicable to natural fibers, e.g., wool, animalized cotton and silk. Furthermore, it is also possible to use a combination of any two or more synthetic or natural fibers to form a composite fabric. Union dyeing is provided on the composite fabric by using the disazo dyes described herein.

The metal, which is incorporated into the fiber, forms a reaction product with the subsequently applied dye composition. Aluminum and zinc are the preferred metals, and they are utilized as metallic compounds. Organic metal salts which are preferred may be employed within the range of .02 to .2% based upon the weight of the fiber. Carboxylic acid metal salts with 6 to 20 carbon atoms, which are suitable for this invention include aluminum stearate, zinc stearate, aluminum laurate, and the aluminum salt of 2-ethyl hexanoic acid. These salts are intimately dispersed throughout the polymer at any stage prior to its extrusion. An efficient blending apparatus is usually adequate to accomplish this result. After dispersion the blend may be extruded at the fluid temperature of the polymer, i.e., 250 to 350° C. for polypropylene. Accordingly, the metal is usually distributed uniformly throughout the fiber, e.g., polyolefin fiber, which provides complete penetration of the dye from the dye bath into the fibers. By way of illustration, the incorporation of the metal salt in the polymer may be made by mixing 10 parts of the powder of the salt with 90 parts of the powder of the polymer to an intimate and uniformly dispersed mixture. This mixture may be extruded to form a concentrate which subsequently is finely divided again and intimately blended with additional polymer to obtain the desired low concentration of metal for extrusion to the shaped product.

The substituted salicylic dyes heretofore described form the basis of an aqueous dye bath into which the fibers are immersed. Since the dyes are insoluble in water, they are dispersed or emulsified in the bath. The concentration of the dye bath can vary over a wide range, depending upon the depth of shade desired. Any known dyeing technique can be employed in this invention. For example, a skein can be simply immersed into the bath at its approximate boiling temperature; or a finished piece can be dyed by using a jigger. The dye bath can be slightly acidic and the fiber is usually rinsed and dried subsequent to its immersion in the dye bath. Known pressure dyeing techniques which accelerate the entry of the dye into the fiber may also be used.

In another embodiment of the present invention, the fiber, i.e., a synthetic or natural fiber, is not modified with a metallic material. This unmodified fiber is immersed directly into a dye bath and subsequently rinsed and dried. These steps can be accomplished by any procedure known in the art and can be similar to the procedures described for the above embodiment. For example, the aqueous dye bath suspension can contain a sulfonated oil, soap, sodium lignin sulfonate, or other suitable dispersing agent. Although direct dyeing operations are generally performed at temperatures of about 160° to 212° F., any suitable temperature can be used, including pressure dyeing and thermofixation techniques. The fiber to be dyed is usually added to the dye bath initially at a relatively low temperature and then a higher temperature is provided for carrying out the actual dyeing operation. The intensity of dyeing is varied by changing the proportion of the weight of dye to the weight of the fiber.

Thus, in accordance with the instant invention, substituted salicylic disazo compounds have been provided which are suitable dyestuffs. Furthermore, these water-insoluble compounds will react will metal-modified shaped articles to form a dyed end product that is fast to dry cleaning and washing. Similarly, these compounds can be applied directly to dye an unmodified fiber since, for example, nylon, polyester, and acrylic fibers have polar groups which can form a polar linkage with the present dyes to improve the receptivity of the dye and the fastness properties of the dye on the fibers.

The following examples are submitted to illustrate but not to limit this invention. Unless otherwise indicated, all parts and percentages in the specification are based upon weight.

*Example I*

Fiber grade polypropylene, which was blended intimately and uniformly with 0.080 wt.% of aluminum monostearate, was used to manufacture 4½ denier crimped staple fiber by melt extruding, stretching, crimping, and cutting to a 2 in. length. This cut fiber was subsequently carded and spun to produce yarns approximating .10's single (cotton system) count. Convenient sized skeins were then reeled from this yarn.

Samples containing ten grams of skein were provided. Each of these samples was immersed in a 500 cc. dye bath at 120° F. The bath consists of an aqueous dispersion of 0.6 gram of the dry dyestuffs indicated in Table I. Prior to the entry of the yarn, sufficient acetic acid was added to the dye bath to provide a pH of 6.0. The dyeing was accomplished by gradually raising the temperature of the dye bath to its boiling point during a 30 minute period. The skein was frequently turned with a glass stirring rod and the temperature was maintained at 212° F. for a period of one hour. The yarn was then removed from the dye bath and thoroughly rinsed in running water at 160° F. The skein was subsequently scoured by turning it for 30 minutes at 160° F. in a 400 cc. aqueous bath containing ½% of Triton X–100 (iso-octyl-phenyl poly ethoxy ethanol) and ½% of sodium carbonate. A thorough rinse was subsequently performed in running water at 110° F.

The dyed samples were then subjected to some of the following tests. The other tests are applicable to subsequent examples.

(1) Color fastness to dry cleaning: Tentative Test Method 85–1960 (1960 Technical Manual of the American Association of Textile Chemists and Colorists, pages 88–9) amended as follows: the temperature shall be 115° F.; the time shall be 1 hour; and the amount of perchlorethylene shall be 200 cc.

(2) Color fastness to washing (polypropylene): Tentative Test Method 61–1960, test number III–A (1960 Technical Manual of the American Association of Textile Chemists and Colorists, pages 93–4). In each instance, the dyeings shall rate (for polypropylene) as follows: for color loss, class 5; for staining, class 3 or better.

(3) Color fastness for washing (synthetics): AATCC tentative test method 61–1961 T (page 105 loc. cit.) with Test III–A being used for polyester and after-chromed nylon and Test II–A for nylon.

(4) Color fastness to light: AATCC Standard Test Method 16–A—1960 (page 90 loc. cit.).

(5) Color fastness to oxides of nitrogen in the atmosphere: Three cycles were used of Standard Test Method 23–1957 (page 98 loc. cit.) or Standard Test Method 75–1956 (page 100 loc. cit.).

(6) Sublimation and heat fastness tests: Sublimation and heat fastness tests were run at 265° F. for 15 minutes.

The results of these tests and the color of the dyed samples are promulgated in Table I.

TABLE I

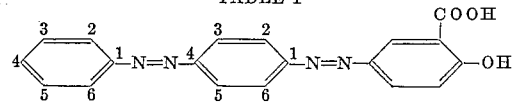

(A)  (B)  (C)

| Dye No. | A-Ring Substituents | B-Ring Substituents | Shade [a] | Fastness [b] |
|---|---|---|---|---|
| 1 | 3-NO₂ | | Salmon | (d) |
| 2 | 4-NO₂ | | Golden Orange | (e) |
| 3 | 2-NO₂; 4-CH₃ | 2-OCH₃; 5-CH₃ | Peach | (f) |
| 4 | 2,6 diCl; 4-NO₂ | 2,5 di-OCH₃ | Salmon | (e) |
| 5 | 4-Br | | Yellow | (e) |
| 6 | 3-Cl | | Golden Yellow | (e) |
| 7 | 4-CH₃C=O | | Orange | (e) |
| 8 | 4-NO₂ | 2,3 di-Cl | Yellow | (f) |
| 9 | 4-NO₂ | 2,5 di-OCH₃ | Salmon Red | (e) |
| 10 | 4-F | | Yellow | (e) |
| 11 | 4-CO₂H | | Neutral Yellow | (f) |
| 12 | 2-CF₃ | | Yellow | (e) |

[a] Similar results are obtained with the o-cresotinic acid group on the C-Ring.
[b] All dyeings are fast to washing, dry cleaning, as per tests cited and also fast to three cycles gas fading. Fastness rating in this table refers only to light fastness as follows:
  [c] Outstanding for even pale shades.
  [d] Fair.
  [e] Excellent.
  [f] Good.

*Example II*

The following blend was formed: 34.4 parts parabromoaniline (0.2 mol), 68.0 parts concentrated hydrochloric acid (0.6 mol) and 100 parts water. After cooling to 12° C., 145 parts of 10% aqueous sodium nitrite (0.21 mol) were added thereto with stirring for ½ hour at 10° C. Subsequently, 41.8 parts aniline N methanesulfonic acid (0.2 mol) and 31.8 parts sodium carbonate (0.3 mol) were incorporated into the blend at 10° C. with an addition time of 3 hours.

The next steps in the process were as follows: stirring all night while warming to 22° C.; filtering; blending the presscake with 40 parts of 30% sodium hydroxide (0.5 mol); heating until the methane sulfonic acid group was completely hydrolyzed; filtering; and washing. Subsequently, 204 parts of a 20% paste of parabromobenzeneazoaniline (0.15 mol) were dissolved in 750 parts of dimethylformamide with the addition of 11 parts sodium nitrite (0.16 mol). After cooling to 12° C., 70 parts 20% hydrochloric acid (0.38 mol) were incorporated. One hour later the resulting system was drowned into 2000 parts water and stirred for an additional hour with clarification. A solution of 20.7 parts salicylic acid (0.15 mol), 40.4 parts sodium carbonate (0.38 mol) and 350 grams water was added over a 90 minute period at a temperature of 10° C. It was stirred all night while the temperature was increased to 22° C. and then acidified and filtered. The presscake therefrom was dispersed with the aid of 5 grams of the sodium salt of sulfonated naphthaleneformaldehyde condensate.

The compound prepared in accordance with the above technique provided a yellow dye on polypropylene which had excellent fastness.

*Example III*

A 4-nitro-2,6-dichlorobenzeneazo - 2,5 - dimethoxybenzeneazosalicylic acid dye compound was provided from 209 parts (0.1 mol) 20% stabilized 4(4'-nitro-2',5'-dichlorobenzeneazo) - 2,5 - dimethoxyphenyldiazonium salt (Fast Navy Blue RA salt of Hoechst) dissolved in 1000 parts dimethylformamide. The inorganic salts were filtered out and 13.8 parts (0.01 mol) salicylic acid and 6.0 parts sodium acetate were admixed with the filtrate. The admixture was stirred at ambient temperature for 2 hours, drowned into 3000 parts water, filtered and washed. The presscake therefrom was dispersed with a dispersing agent.

Nylon was dyed in accordance with the following procedure. The above dye compound was added to 300 parts of water with the pH being adjusted to 4–5. A 10 gram skein was added thereto, and the bath was brought to boil for 1 hour. The skein was subsequently rinsed.

A Dacron fiber was dyed by providing a bath at 180° F. containing 200 parts water and 1.5 parts of a blend of 67% biphenyl and 33% anionic emulsifier. Ten grams of skein were incorporated for a five to ten minute run. The dye, which had been previously pasted and dispersed in 100 parts water, was added and the temperature of the bath was raised to boil for 1 to 1½ hours. The following procedures were subsequently employed: rinsing for 5 minutes in a fresh bath heated as rapidly as possible to 190 to 200° F.; dropping without cooling; and scouring at 200° F. for 15 to 20 minutes.

Polypropylene was dyed as per the technique described in Example I.

The results were as follows: Dacron was dyed with brownish rust color; nylon with a maroon color; and polypropylene with a salmon color having excellent fastness properties.

*Example IV* p-Acetophenoneazobenzeneazosalicylic acid was formed by combining at 12° C. 40.6 parts (0.3 mol) p-aminoacetophenone, 1500 parts water, 100 parts (0.86 mol) 32% hydrochloric acid and 0.2 part sulfonated succinic acid dioctylester with 21.0 parts (0.3 mol) sodium nitrite being added over a period of 30 minutes. The mixture therefrom was stirred for 2 hours, clarified and slowly added to a cooled solution comprising 62.7 parts (0.3 mol) aniline methane sulfonic acid, 300 parts water, and 31.8 parts (0.3 mol) sodium carbonate with subsequent stirring at 14° C. for 2 hours and warming up to 22° C. over a 16 hour period. Forty parts (0.5 mol) 50% sodium hydroxide were then added and the ingredients were boiled for 1 hour, cooled, filtered, and washed neutral. The filter cake therefrom was slurried with 3000 parts water and 1100 parts (0.86 mol) of 32% hydrochloric acid. After cooling to 12° C. over a period of 30 minutes, 210 parts (0.3 mol) 10% aqueous sodium nitrite solution were included with stirring for 2 hours and subsequent filtration for clarification. Subsequently, a solution comprising 41.4 parts (0.3 mol) salicylic acid, 15.9 parts (0.15 mol) sodium carbonate and 700 parts water was added at 14° C. The reaction mixture therefrom was neutralized to a pH of 7 by means of a 20% sodium carbonate solution and was stirred for 16 hours while the temperature rose to 22° C. After filtering and washing neutral, the presscake was dispersed with the aid of Tamol N (sodium salt of the sulfonic acid of naphthaleneformaldehyde condensation product).

The product obtained from this procedure provided an orange dye on polypropylene which had outstanding fastness properties even in very pale shades.

*Example V*

The following procedure was used to form m-chlorobenzeneazobenzeneazosalicylic acid: 46.4 parts (0.2 mol) m-chlorobenzeneazoaniline, 1000 parts dimethylformamide, 14.5 parts (0.21 mol) sodium nitrite, and 57.0 parts (0.5 mol) 32% hydrochloric acid were stirred for 3 hours at 22° C.; and 2000 parts water were incorporated with stirring for 30 minutes with clarification. A cooled solution containing 27.6 parts (0.2 mol) salicylic acid, 63.6 parts (0.6 mol) sodium carbonate and 600 parts water was added thereto over a 2 hour period with a temperature of 10° C. After stirring overnight with the temperature being raised to 22° C. and the pH being adjusted to 7, the product was filtered and dispersed in the same manner described in Example IV.

This end product dyed polypropylene in a golden yellow shade with excellent fastness to light, wash, dry cleaning, gas fading and sublimation.

*Example VI* p - Nitrobenzeneazo - 2,3 - dichlorobenzeneazo - 5-salicylic acid was formed from 1000 parts 93% sulfuric acid, which was previously cooled in an ice bath to 25° C., and 313 parts (0.1 mol) of a 10% aqueous paste of 4(4'-nitrobenzeneazo)-2,3-dichloroaniline. Sodium nitrite was then added until a positive test was provided on potassium iodide paper. Fifteen minutes later, the reaction mixture was drowned into 1500 parts water. A sufficient amount of calcium hydroxide was subsequently added under cooling conditions to precipitate all the sulfate ions. After filtration, 15.2 parts (0.1 mol) salicylic acid methylester was added at 14° C. to the filtrate and the pH was adjusted to 6 with sodium carbonate. This was stirred for 16 hours while the temperature was increased to 22° C., and the supernatant liquid was poured off. The pH was adjusted to 11 by the addition of sodium hydroxide. After being brought to boil for 1 hour, the reaction mixture was cooled, acidified and filtered. The presscake was dispersed with the aid of a dispersing agent.

This compound was found to be a satisfactory dye.

*Example VII*

N,N - dihydroxyethylaminobenzeneazobenzeneazosalicylic acid was prepared by dissolving at 75° C. 77 parts of 4-aminophenylazosalicylic acid (0.3 mol) into 1500 parts water and 100 parts of 32% hydrochloric acid (0.9 mol). This solution was cooled to 35° C. and poured onto 500 parts of ice with the addition below 10° C. of 214 parts of a 10% sodium nitrite solution. After being stirred for 30 minutes, a solution comprising 48.3 parts (0.3 mol) N,N-dihydroxyethylaminobenzene in 900 parts water and 100 parts concentrated hydrochloric acid was incorporated at 12° C. over a 3 hour period. This reaction mixture was stirred for 12 additional hours at ambient temperature and subsequently filtered, washed and dispersed.

The resultant compound dyed polypropylene, which had 5% aluminum stearate uniformly dispersed therein, to a yellowish green shade fast to wash and dry cleaning.

*Example VIII*

Crude 4-fluorobenzeneazobenzeneazosalicylic acid was dissolved in dimethylformamide with an excess 10% aqueous aluminum sulfate solution being added thereto. The pH was subsequently adjusted to 5.5. The aluminum chelate, which precipitates out, was filtered and washed. The presscake therefrom was taken up in 5% hydrochloric acid and kept at reflux temperatures for one hour. The aluminum chelate was decomposed and by filtering and washing with dilute hydrochloric acid a purified dyestuff was obtained.

*Example IX*

The compounds listed herebelow in Table II have been found to give dyeings which are fast to washing and dry cleaning on polypropylene when modified by a metallic compound. They are also considered to be useful for dyeing other thermoplastic fibers, which are unmodified or modified by a metallic compound, and they are also considered to be suitable for dyeing wool.

TABLE II

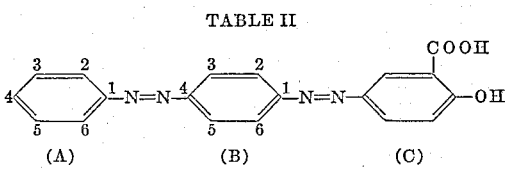

| Dye No.[c] | A-Ring Substituents | B-Ring Substituents |
|---|---|---|
| 13 | 2-$NO_2$ | |
| 14 | 2-$OCH_3$; 5-$SO_2NHC_4H_9$ | |
| 15 | 4-$NO_2$ | 2,5 di-$OC_2H_5$ |
| 16 | 4-($CH_2OHCH_2$)$_2$N | |
| 17 | 4-($CH_2OHCH_2$)HN | |
| 18 | 4-CN; 2-$CH_3O$ | 2-Cl; 3-Cl |
| 19 | 2,4 di-OH | |
| 20 | 3-$CH_3O$ | |
| 21 | 2-$OCH_3$; $SO_2N(C_2H_5)_2$ | |
| 22 | 4-$C_6H_5CONH$ | |
| 23 | $COOC_2H_5$ | |
| 24 | ($CH_3$)$_2$N | |
| 25 | 2-OH | |
| 26 | 4-SCN | |
| 27 | 4-$C_6H_5CO$— | 2-$CF_3$ |
| 28 | 4-$CH_3$ | |
| 29 | 4-$C_{12}H_{14}$— | |
| 30 | 3-OH | |
| 31 | 4-CN($C_2H_4$)O [a] | |
| 32 | 4-$CH_3SO_2$ [b] | |
| 33 | 4-($CNC_2H_4$)$_2$N— | |

[a] β-cyanoethoxy.
[b] Methane sulfonyl.
[c] Dyes are also operable with the o-cresotinic acid group on the C-Ring.

*Example X*

Some of the dyes indicated in Tables I and II were applied directly to nylon, acrylic and Dacron fibers without chelating metals therein. The dyeing procedures were comparable to the ones described in the previous examples.

The results are shown in Table III.

TABLE III

| Dye No. | Shade on Nylon | Shade on Acrylic | Shade on Dacron |
|---|---|---|---|
| 2 | Yellow brown | Yellow brown | Yellow orange. |
| 3 | Red orange [a] | | |
| 4 | Maroon [c] | | Red brown.[a] |
| 8 | Yellow | | Yellow.[a] |
| 9 | Maroon | | Red brown.[b] |
| 11 | Yellow | | Yellow. |
| 15 | Maroon | | Red brown. |
| 17 | | | Pale orange. |

[a] Excellent fastness.
[b] Good fastness.
[c] Fair fastness.

Having set forth the general nature and specific embodiments of the present invention, the scope is now particularly pointed out in the appended claims.

We claim:
1. A dye having the structure:

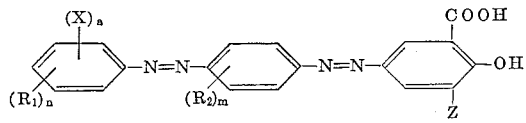

wherein each X is a substituent group attached to the benzene nucleus independently selected from the group consisting of carbacyl having up to 6 carbon atoms, benzoyl, N-alkylsulfonamido said alkyl containing 1–5 carbon atoms, N,N-dialkylsulfonamido each of said alkyls containing 1–5 carbon atoms, cyano, benzoylamino, carboalkoxy containing 1–4 carbon atoms, beta-cyanoethyloxy, methylsulfonyl, thio - cyano, di - (beta - hydroxyethyl)-amino, beta-hydroxyethylamino and di-(beta-cyanoethyl)-amino; $R_1$ and $R_2$ are methyl groups; Z is selected from the group consisting of hydrogen and methyl; $a$ is an integer from 1 to 3 inclusive; $n$ is an integer from 0 to 1 inclusive; and $m$ is an integer from 0 to 1 inclusive.

2. A dye composition which is 4-(2-nitro-4-methylbenzeneazo)-2-methoxy-5-methylbenzeneazosalicylic acid.

3. A dye composition which is 4-(2,6-dichloro-4-nitrobenzeneazo)-2,5-dimethoxybenzeneazosalicylic acid.

4. A dye composition which is 4-(4-nitrobenzeneazo)-2,5-dimethoxybenzeneazosalicylic acid.

5. A dye composition which is 4-(4-nitrobenzeneazo)-2,5-diethoxybenzeneazosalicylic acid.

6. A dye composition which is 4-[4-di-(beta-hydroxyethyl)-aminobenzeneazo]-benzeneazosalicylic acid.

7. A dye composition which is 4-(4-nitrobenzeneazo)-2,3-dichlorobenzeneazosalicylic acid.

8. A dye composition which is 4-(p-acetophenoneazo)-benzeneazosalicylic acid.

9. A dye composition which is 4-(3-chlorobenzeneazo)-benzeneazosalicylic acid.

10. A dye composition which is 4-(4-fluorobenzeneazo)-benzeneazosalicylic acid.

11. A dye composition which is 4-(2-trifluoromethylbenzeneazo)-benzeneazosalicylic acid.

References Cited by the Examiner

UNITED STATES PATENTS

| 2,264,604 | 4/1918 | Bohn | 260—148 |
| 2,096,722 | 10/1937 | Andersen | 260—148 |
| 2,867,494 | 1/1959 | Streck | 8—42 |
| 2,893,814 | 7/1959 | Streck | 8—42 |
| 3,096,140 | 7/1963 | Gaetani | 260—174 XR |
| 3,098,847 | 7/1963 | Gaetani | 260—187 |

FOREIGN PATENTS 880,858  10/1961  Great Britain.

OTHER REFERENCES

Venkataraman, Synthetic Dyes (1952), vol. I, pp. 565–567.

CHARLES B. PARKER, *Primary Examiner.*

A. H. WINKKELSTEIN, *Examiner.*

J. HERBERT, NORMA S. MILESTONE, REYNOLD J. FINNEGAN, FLOYD D. HIGEL,
*Assistant Examiners.*